(12) United States Patent
Schwarz et al.

(10) Patent No.: US 10,358,804 B1
(45) Date of Patent: Jul. 23, 2019

(54) LAVATORY SINK DRAIN ASSEMBLY

(71) Applicant: AMERICAN AIRLINES, INC., Fort Worth, TX (US)

(72) Inventors: Jason Edward Schwarz, Charlotte, NC (US); Michael Harlin Davis, Charlotte, NC (US); Vic Douglas Lewellen, Belmont, NC (US)

(73) Assignee: AMERICAN AIRLINES, INC., Fort Worth, TX (US)

(*) Notice: Subject to any disclaimer, the term of this patent is extended or adjusted under 35 U.S.C. 154(b) by 0 days.

(21) Appl. No.: 15/817,709

(22) Filed: Nov. 20, 2017

Related U.S. Application Data

(60) Provisional application No. 62/428,681, filed on Dec. 1, 2016.

(51) Int. Cl.
| | |
|---|---|
| *E03C 1/264* | (2006.01) |
| *E03C 1/22* | (2006.01) |
| *B64D 11/02* | (2006.01) |
| *E03C 1/14* | (2006.01) |

(52) U.S. Cl.
CPC .............. *E03C 1/264* (2013.01); *E03C 1/22* (2013.01); *B64D 11/02* (2013.01); *E03C 1/14* (2013.01)

(58) Field of Classification Search
CPC ... E03C 1/264; E03C 1/22; E03C 1/14; E03C 11/02

USPC ...................................................... 4/289–292
See application file for complete search history.

(56) References Cited

U.S. PATENT DOCUMENTS

| | | | | |
|---|---|---|---|---|
| 1,233,272 | A | * | 7/1917 | Hotchkiss ............... E03C 1/264 210/498 |
| 1,333,433 | A | * | 3/1920 | Maisano ................. E03C 1/264 4/289 |
| 1,595,516 | A | * | 8/1926 | Happ ...................... E03C 1/262 4/287 |
| 4,751,752 | A | * | 6/1988 | Ewing ...................... A47K 1/14 4/286 |
| D348,924 | S | * | 7/1994 | Merrett ........................ D23/261 |
| 6,023,795 | A | | 2/2000 | Potter et al. |
| 6,387,261 | B1 | * | 5/2002 | Mojena ................ B01D 24/008 210/315 |

\* cited by examiner

Primary Examiner — Huyen D Le
(74) Attorney, Agent, or Firm — Haynes and Boone, LLP

(57) ABSTRACT

A method and apparatus according to which a first portion of a fluid is communicated through one or more first openings of a drain plug sieve, the first portion of the fluid is filtered with a filter element of a filter assembly, the filter assembly comprising an inner tubular member, an outer tubular member within which the inner tubular member extends, and the filter element, which filter element extends within an annular region defined between the inner tubular member and the outer tubular member, a second portion of the fluid is communicated through one or more second openings of the drain plug sieve, and the second portion of the fluid is permitted to flow through a first fluid passage of the inner tubular member to bypass the filter element.

24 Claims, 6 Drawing Sheets

LAVATORY SINK DRAIN ASSEMBLY

CROSS-REFERENCE TO RELATED APPLICATION

This application claims the benefit of the filing date of, and priority to, U.S. Application No. 62/428,681, filed Dec. 1, 2016, the entire disclosure of which is hereby incorporated herein by reference.

TECHNICAL FIELD

The present disclosure relates to drain assemblies and, in particular, lavatory sink drain assemblies for use in, for example, commercial aircraft.

BACKGROUND

A commercial airplane may include a lavatory, which typically includes a toilet and a washbasin or sink. A drain assembly is connected to the sink, and a drain valve may be in fluid communication with the drain assembly. Fluid drains from the sink via the drain assembly, and then flows through the drain valve. In some cases, the drain valve may become clogged, preventing use of the sink, requiring repair, and increasing aircraft maintenance costs. Instead of, or in addition to the drain valve becoming clogged, the drain assembly may become clogged, also preventing use of the sink, requiring repair, and increasing aircraft maintenance costs. Frequent clogging of the drain valve and/or the drain assembly may necessitate more maintenance intervals, thereby further increasing aircraft maintenance costs. Therefore, what is needed is an apparatus, assembly, kit, or method that addresses one or more of the foregoing issues, and/or one or more other issues.

DETAILED DESCRIPTION

Figure 1:
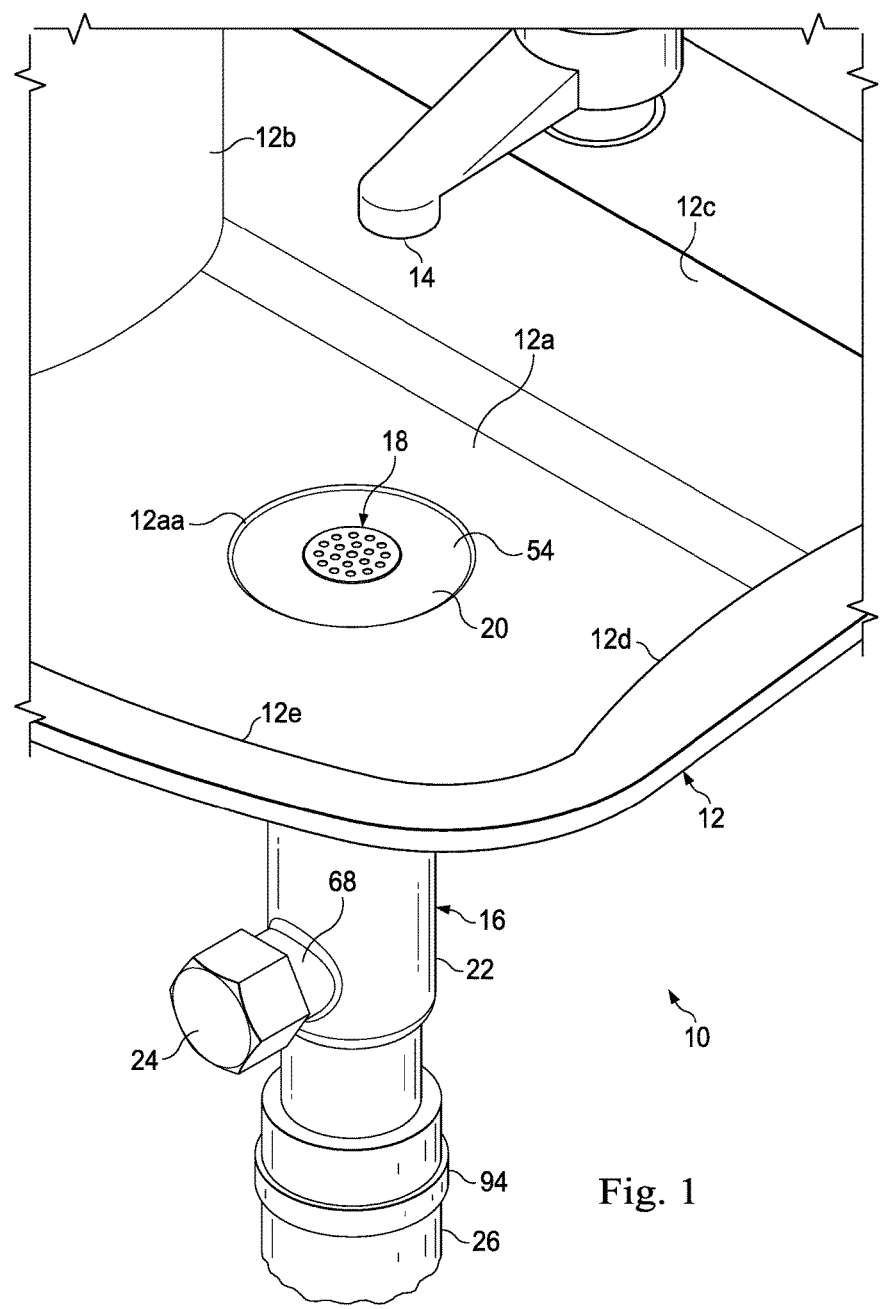
FIG. 1 is a perspective view of a portion of a washbasin or sink and a drain assembly connected thereto, according to an example embodiment.

In an example embodiment, as illustrated in FIG. 1, a system is generally referred to by the reference numeral 10 and includes a washbasin or sink 12, which includes a bottom basin 12a, and side walls 12b, 12c, 12d, and 12e extending upward from the bottom basin 12a. A generally circular recess 12aa is formed in the upper side of the bottom basin 12a. A faucet 14 is operably associated with the sink 12. A drain assembly 16 is connected to the bottom basin 12a. In several example embodiments, the system 10 is located within, and/or is a part of, a lavatory. In several example embodiments, the system 10 is located within, and/or is a part of, a lavatory of a commercial airplane.

Figure 2:
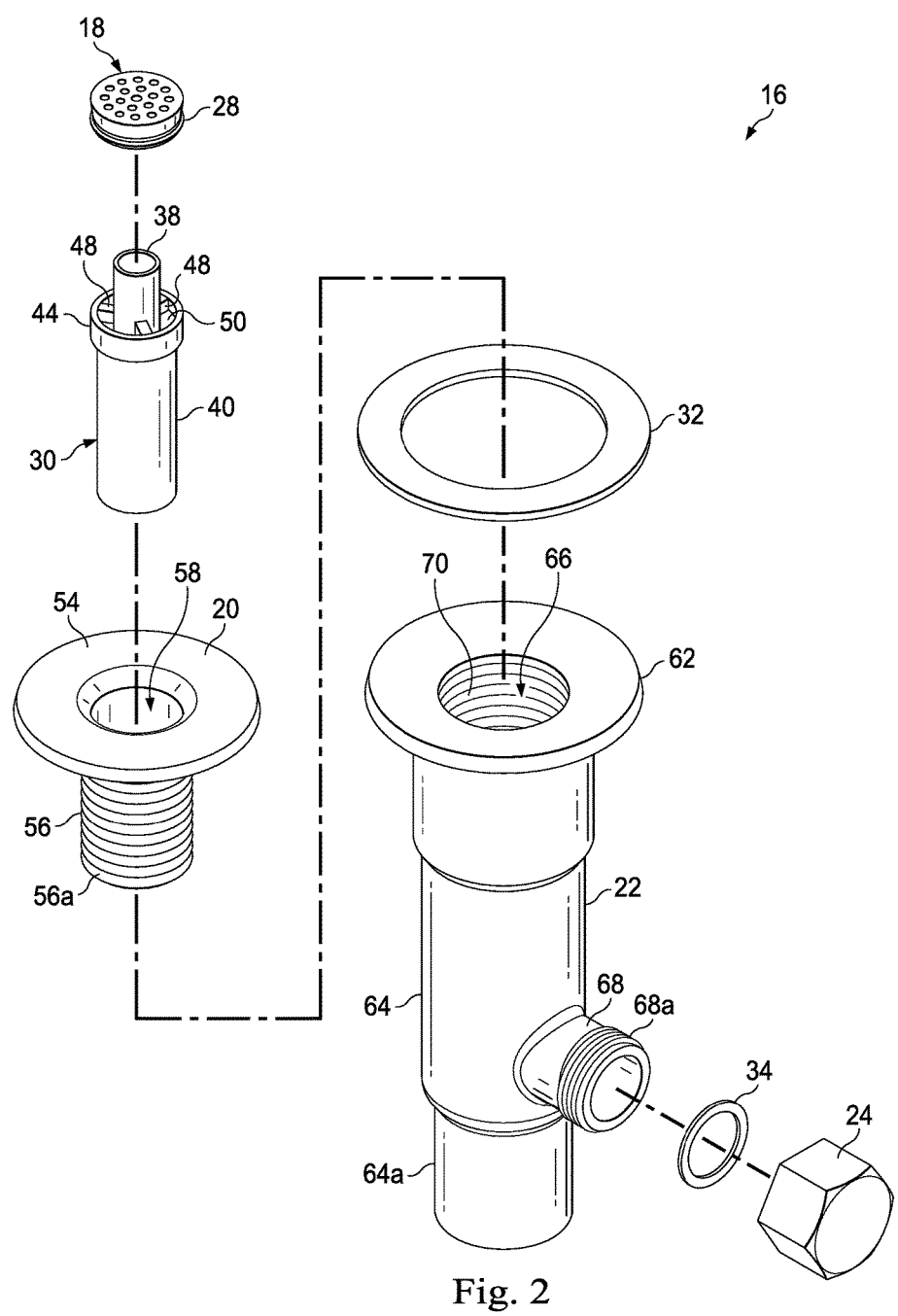
FIG. 2 is an exploded perspective view of the drain assembly of FIG. 1, according to an example embodiment.

In an example embodiment, as illustrated in FIGS. 1 and 2, the drain assembly 16 includes a drain plug sieve 18, a collar 20, a drain body 22, and a cap nut 24. As shown in FIG. 1, a drain line such as a hose 26 is connected to the lower portion of the drain body. As shown in FIG. 2, the drain assembly 16 further includes an annular sealing element such as an o-ring 28, a filter assembly 30, an annular sealing element such as a gasket 32, and an annular sealing element such as a gasket 34.

In an example embodiment, as illustrated in FIGS. 1, 2, 3, and 4, the filter assembly 30 includes a filter body 36, the filter body 36 including an inner tubular member 38 defining a fluid passage 38a, an outer tubular member 40 within which the inner tubular member 38 extends, and an annular region 42 defined between the inner tubular member 38 and the outer tubular member 40. An annular protrusion 44 extends radially outward from the upper end of the outer tubular member 40, thereby defining an external shoulder 46 of the outer tubular member 40. A plurality of radially-extending spokes 48 extends between the inside surface of the outer tubular member 40 (adjacent, or at least proximate, the annular protrusion 44) and the outside surface of the inner tubular member 38. In an example embodiment, as shown in FIG. 2, the filter body 36 includes three (3) spokes 48. Internal regions 50 are radially defined between the inside surface of the annular protrusion 44 and the outside surface of the inner tubular member 38, and are circumferentially defined between circumferentially-adjacent pairs of the spokes 48. In an example embodiment, as shown in FIG. 2, the filter body 36 includes three (3) internal regions 50.

The filter assembly 30 further includes a filter element 52, which extends within the annular region 42 of the filter body 36. In an example embodiment, the filter element 52 is a mesh filter having a generally cylindrical shape. In an example embodiment, the filter element 52 includes a plurality of mesh filters, all or most of which extend within the annular region 42 of the filter body 36. In an example embodiment, the filter element 52 is held in place in the annular region 42 via friction. In an example embodiment, the filter element 52 is bonded to one or both of the tubular members 38 and 40. In several example embodiments, one or more brackets and/or other mechanical feature(s) (not shown) support the filter element 52 at its lower end portion; in at least one such example embodiment, these brackets and/or other feature(s) are part of, or are connected to, one or both of the tubular members 38 and 40.

Figure 3:
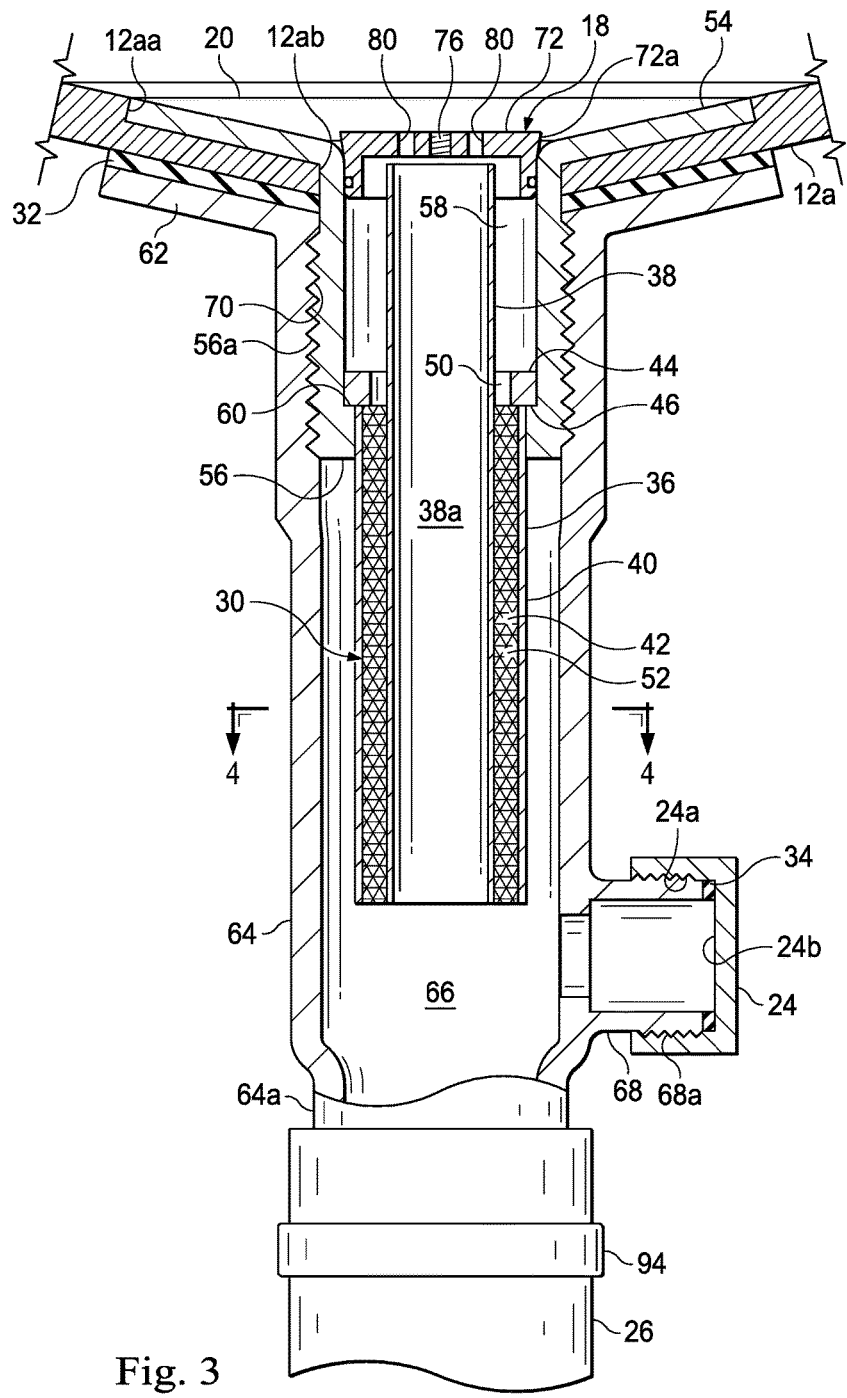
FIG. 3 is a sectional view of the drain assembly of FIGS. 1 and 2 connected to the washbasin or sink of FIG. 1, according to an example embodiment.

In an example embodiment, with continuing reference to FIGS. 1, 2, 3, and 4, the collar 20 includes an upper flange 54 and a tubular body 56 extending downward therefrom. The tubular body 56 includes an external threaded connection 56a. A fluid passage 58 extends through the upper flange 54 and the tubular body 56. As shown in FIG. 3, an internal shoulder 60 is defined in the inside surface of the tubular body 56.

In an example embodiment, as illustrated in FIGS. 1, 2, and 3, the drain body 22 includes an upper flange 62 and a tubular body 64 extending downward therefrom. A fluid passage 66 extends through the upper flange 62 and the tubular body 64. A branch member 68 extends perpendicularly from the tubular body 64, the branch member 68 including an external threaded connection 68a. The tubular body 64 includes a reduced-diameter lower end portion 64a. As shown in FIGS. 2 and 3, an internal threaded connection 70 is formed in the inside surface of the tubular body 64, the internal threaded connection 70 being adjacent, or at least proximate, the upper flange 62. As shown in FIG. 3, the cap nut 24 includes an internal threaded connection 24a, and the bottom basin 12a further includes an opening 12ab extending therethrough and generally centered within the circular recess 12aa.

Figure 4:
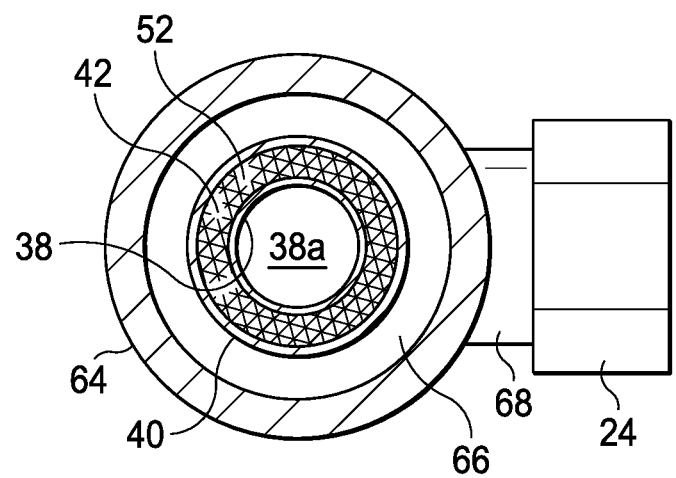
FIG. 4 is a sectional view of the drain assembly taken along line 4-4 of FIG. 3, according to an example embodiment.
Figure 5:
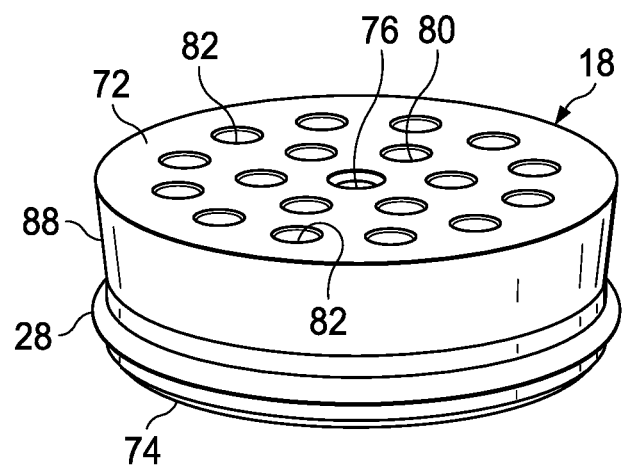
FIG. 5 is a perspective view of a drain plug sieve of the drain assembly of FIGS. 1-4, according to an example embodiment.
Figure 6:
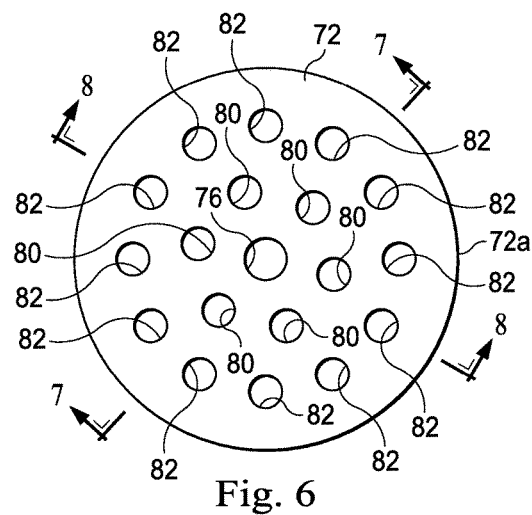
FIG. 6 is a top plan view of the drain plug sieve of FIG. 5, according to an example embodiment.
Figure 7:
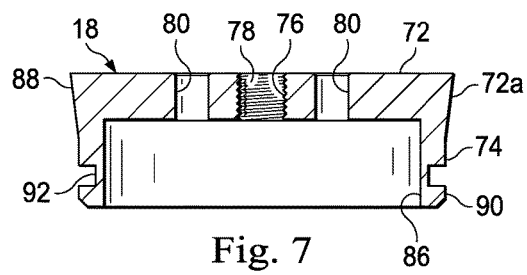
FIG. 7 is a sectional view of the drain plug sieve of FIGS. 5 and 6 taken along line 7-7 of FIG. 6, according to an example embodiment.
Figure 8:
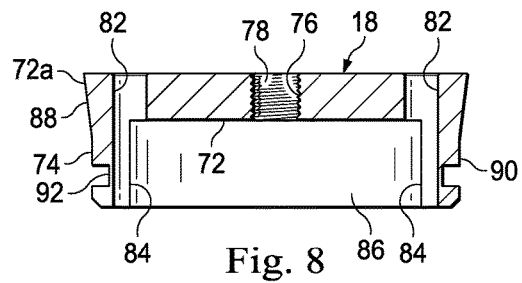
FIG. 8 is a sectional view of the drain plug sieve of FIGS. 5 and 6 taken along line 8-8 of FIG. 6, according to an example embodiment.

In an example embodiment, as illustrated in FIGS. 5, 6, 7, and 8 with continuing reference to FIGS. 1, 2, 3, and 4, the drain plug sieve 18 includes a top cap 72 and an annular body 74 extending downward therefrom. The o-ring 28 extends around the annular body 74. A center opening 76 is formed through the center of the top cap 72. As shown in FIGS. 7 and 8, an internal threaded connection 78 is formed in the inner vertically-extending wall of the top cap 72 defined by the extension of the center opening 76 therethrough. A plurality of circumferentially-spaced openings 80 are formed through the top cap 72, and are circumferentially spaced around the center opening 76. In an example embodiment, as shown in FIG. 6, the openings 80 are circumferentially spaced evenly around the center opening 76. In an example embodiment, as shown in FIG. 6, the drain plug sieve 18 includes six (6) of the openings 80. In an example embodiment, as shown in FIG. 6, the openings 80 are circumferentially aligned so that the respective radial spacings between the center opening 76 and each of the openings 80 are equal.

A plurality of circumferentially-spaced openings 82 are formed through the top cap 72, and are circumferentially spaced around the center opening 76. In an example embodiment, as shown in FIG. 6, the openings 80 are circumferentially spaced evenly around the center opening 76. The plurality of openings 80 is located radially between the center opening 76 and the plurality of openings 82. The plurality of openings 82 is located radially between the plurality of openings 80 and an outer circumferential edge 72a of the top cap 72. The openings 82 extend through the top cap 72, and further through the annular body 74, forming respective vertically-extending channels 84 in an inside cylindrical surface 86 of the annular body 74. As a result, the annular body 74 includes a plurality of the channels 84, which are circumferentially spaced around the center opening 76. Two (2) of the channels 84 are shown in FIG. 8, but the remaining channels 84 are omitted from view in FIG. 8 for clarity. The channels 84 are also omitted from view in FIGS. 3, 7, and 9 for clarity. In an example embodiment, as shown in FIG. 6, the drain plug sieve 18 includes twelve (12) of the openings 82; accordingly, in an example embodiment, the drain plug sieve 18 includes twelve (12) of the channels 84. In an example embodiment, as shown in FIG. 6, the openings 82 are circumferentially aligned so that the respective radial spacings between the center opening 76 and each of the openings 82 are equal.

The top cap 72 and the annular body 74 together define a tapered external side surface 88, which tapers angularly inward from the outer circumferential edge 72a of the top cap 72. The annular body 74 defines an external cylindrical side surface 90, which extends downward from the tapered external side surface 88. An annular groove 92 is formed in the external cylindrical side surface 90. The o-ring 28 extends within the annular groove 92 (the o-ring 28 is shown in FIG. 5 but not in FIGS. 7 and 8).

In an example embodiment, within continuing reference to FIGS. 1, 2, 3, 4, 5, 6, 7, and 8, when the drain assembly 16 is in its assembled condition and is connected to the sink 12 as shown in FIGS. 1, 3, and 4, the gasket 32 is disposed between the underside of the bottom basin 12a and the upper face of the upper flange 62 of the drain body 22. The upper flange 54 of the collar 20 is disposed within the generally circular recess 12aa formed in the upper side of the bottom basin 12a. The tubular body 56 of the collar 20 extends through the opening 12ab of the sink 12, through the gasket 32, and into the fluid passage 66 of the tubular body 64 of the drain body 22. The external threaded connection 56a of the tubular body 56 of the collar 20 is threadably engaged with the internal threaded connection 70 of the drain body 22, thereby connecting the collar 20 to the drain body 22, and sandwiching the gasket 32 between the underside of the bottom basin 12a and the upper face of the upper flange 62 of the drain body 22.

The filter assembly 30 extends within the fluid passage 58 of the collar 20 adjacent, or at least proximate, the tubular body 56 thereof, and within the fluid passage 66 of the drain body 22, so that the external shoulder 46 of the filter body 36 engages, and is supported by, the internal shoulder 60 of the tubular body 56 of the collar 20. More particularly, in several example embodiments, the upper end portion of the inner tubular member 38 of the filter body 36 extends within the fluid passage 58 of the collar 20 and the lower end portion of the inner tubular member 38 extends within the fluid passage 66 of the drain body 22 (and not within the fluid passage 58 of the collar 20). Moreover, in several example embodiments, the lower end portion of the outer tubular member 40 of the filter body 36 extends within the fluid passage 66 of the drain body 22 (and not within the fluid passage 58 of the collar 20). The gasket 34 is disposed between an end face of the branch member 68 opposing the tubular body 64, and an inside surface 24b of the cap 24. The internal threaded connection 24a of the cap nut 24 is threadably engaged with the external threaded connection 68a of the branch member 68, thereby connecting the cap nut 24 to the branch member 68 and sandwiching the gasket 34 between the end face of the branch member 68 and the inside surface 24b of the cap nut 24. The hose 26 is connected to the reduced-diameter portion 64a of the tubular body 64 of the drain body 22; in an example embodiment, the hose 26 is so connected via a hose clamp 94. A drain valve (not shown) is in fluid communication with the drain body 22 via at least the hose 26.

The drain plug sieve 18 extends within the fluid passage 58 of the collar 20 adjacent, or at least proximate, the upper flange 54 thereof so that the o-ring 28 sealingly engages the inside wall of the tubular body 56 of the collar 20, and so that the top surface of the top cap 72 is, or is nearly, generally flush with the top surface of the upper flange 54 of the collar 20; thus, the outer circumferential edge 72a of the top cap 72 engages, or nearly engages, the upper flange 54. In several example embodiments, the drain plug sieve 18 forms an interference fit with the collar 20, causing drain plug sieve 18 to be locked or trapped, or held in place, relative to the collar 20, and thus coupled to the collar 20, and further causing the o-ring 28 to sealingly engage the inside wall of the tubular body 56; in at least one such example embodiment, this interference fit is facilitated by the tapered external side surface 88 of the drain plug sieve 18, the external cylindrical side surface 90 of the drain plug sieve 18, and/or the o-ring 28. The drain plug sieve 18 is positioned, relative to the inner tubular member 38, so that: the center opening 76 is positioned vertically above the fluid passage 38*a* of the inner tubular member 38; at least respective portions of the openings 80 are positioned vertically above the fluid passage 38*a* of the inner tubular member 38; and at least respective portions of the openings 82 are positioned vertically above the annular region 42 defined between the inner tubular member 38 and the outer tubular member 40. In an example embodiment, as shown in FIG. 3, the openings 80 are aligned circumferentially and each of the openings 80 in its entirety is positioned vertically above the fluid passage 38*a* of the inner tubular member 38. In an example embodiment, as shown in FIG. 3, the openings 82 are aligned circumferentially and each of the openings 82 in its entirety is positioned vertically above the annular region 42 defined between the inner tubular member 38 and the outer tubular member 40.

Figure 9:
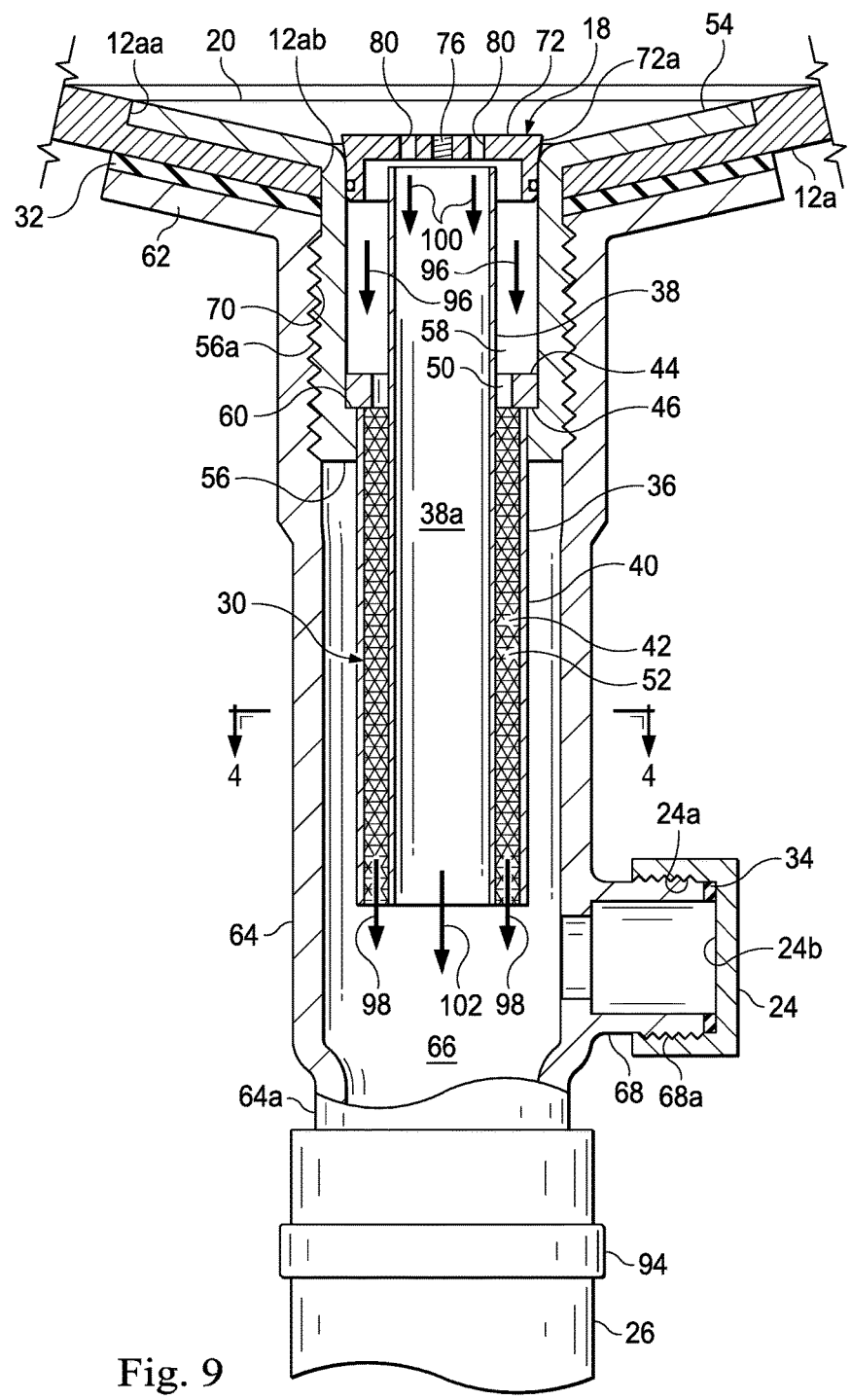
FIG. 9 is a view similar to that of FIG. 3 but depicting the drain assembly in operation, according to an example embodiment.

In operation, in an example embodiment and as illustrated in FIG. 9 with continuing reference to FIGS. 1, 2, 3, 4, 5, 6, 7, and 8, the drain assembly 16 is connected to the sink 12 in accordance with the foregoing and as shown in FIGS. 1, 3, 4, and 9. Fluid is introduced into the sink 12 via, for example, the faucet 14. The fluid collects in the bottom basin 12*a*, flowing towards the drain plug sieve 18. Immediately, or eventually, the volume of the fluid in the vicinity of the upper flange 54 of the collar 20 is such that fluid begins to flow, or be otherwise communicated, through the drain plug sieve 18, through the filter assembly 30, through the drain body 22, through the hose 26, and through the drain valve (not shown) in fluid communication with the drain body 22 via the hose 26.

During the flow or communication of the fluid through the drain plug sieve 18, in an example embodiment, a portion of the fluid flows, or is otherwise communicated, through one or more of the openings 82 and into the fluid passage 58 of the collar 20 (but not into the fluid passage 38*a* of the inner tubular member 38), as indicated by arrows 96; this fluid flows, or is otherwise communicated, through one or more of the internal regions 50 of the filter body 36, and further through the filter element 52, exiting the lower end of the filter assembly 30 and draining into the fluid passage 66 of the drain body 22, as indicated by arrows 98.

During the flow or communication of the fluid through the drain plug sieve 18, in an example embodiment, another portion of the fluid flows, or is otherwise communicated, through one or more of the openings 80 and into the fluid passage 38*a* of the inner tubular member 38, as indicated by arrows 100; this fluid bypasses the filter element 52 and instead flows, or is otherwise communicated, through the fluid passage 38*a*, exiting the lower end of the filter assembly 30 and draining into the fluid passage 66 of the drain body 22. During the flow or communication of the fluid through the drain plug sieve 18, in an example embodiment, yet another portion of the fluid flows, or is otherwise communicated, through the center opening 76, and further through the fluid passage 38*a*, bypassing the filter element 52; this fluid also exits the lower end of the filter assembly 30 and drains into the fluid passage 66 of the drain body 22. Arrow 102 indicates the drainage of the respective portions of the fluid that flow, or are otherwise communicated, through the center opening 76 and one or more of the openings 80, and drain into the fluid passage 66. From the fluid passage 66, the fluid drains or flows through the hose 26 and through the drain valve (not shown).

During the above-described operation of the drain assembly 16, the combination of the top cap 72 and the openings 76, 80, and 82 filter relatively large particles that may be in the fluid, preventing the particles from flowing, or being otherwise communicated, into either the fluid passage 58 or the fluid passage 38*a*. The openings 76, 80, and 82 are sized so that these relatively large particles cannot fit through the openings. The relatively large particles can be easily wiped away from the top cap 72; in several example embodiments, the top surface of the top cap 72 being, or nearly being, generally flush with the top surface of the upper flange 54 of the collar 20, facilitates the ease with which the relatively large particles are wiped away.

During the above-described operation of the drain assembly 16, the filter element 52 filters at least a portion of the particles in the fluid that are small enough to fit through the openings 82, and so flow, or be otherwise communicated, through the openings 82 along with the portion of the fluid that flows, or is otherwise communicated, through the openings 82. However, the particles that are small enough to fit through the openings 76 and 80, and so flow, or be otherwise communicated, through the openings 76 and 80 along with the respective portions of the fluid that flow, or are otherwise communicated, through the openings 76 and 80, are not so filtered because the openings 76 and 80 are located above the fluid passage 38*a* of the inner tubular member 38 (and not through the filter element 52). In several example embodiments, by not filtering particles in the fluid that are small enough to fit through the openings 76 and 80, and so flow, or are otherwise communicated, through the openings 76 and 80 along with the respective portions of the fluid that flow, or are otherwise communicated, through the openings 76 and 80, the drain assembly 16 maintains an acceptable fluid flow therethrough. By not requiring all fluid to flow, or be otherwise communicated, through the filter element 52, the filter element 52 does not get clogged too quickly, thereby allowing continued use of the sink 12 and reducing costs associated with maintenance. Moreover, even if the filter element 52 becomes fully clogged, the drain assembly 16 remains operational because fluid is still permitted to flow, or be otherwise communicated, through the openings 76 and 80, through the fluid passage 38*a*, through the fluid passage 66, through the hose 26, and through the drain valve (not shown); since the drain assembly 16 remains operational, the sink 12 remains operational.

In several example embodiments, by filtering the particles that are small enough to fit through the openings 82, and so flow, or are otherwise communicated, through the openings 82 and into the filter element 52 along with the portion of the fluid that flows, or is otherwise communicated, through the openings 82, the filter element 52 decreases the risk that the drain valve, which is in fluid communication with the drain body 22 via at least the hose 26, will become clogged, thereby allowing continued use of the sink 12 and reducing costs associated with maintenance.

In several example experimental embodiments, when used in airplane lavatories, the drain assembly 16 allows the drain valve, which is in fluid communication with the drain body 22 via at least the hose 26, to remain clear, and provides adequate drainage for a period of at least one month.

In several example embodiments, when used in airplane lavatories, the drain assembly 16 enables maintenance personnel to increase the maintenance interval for the drain assembly 16, that is, the amount of time between routine maintenance items on the drain assembly 16, thereby reducing costs associated with maintenance.

In several example embodiments, the drain assembly 16 allows fluid to drain with a fully clogged filter element 52 without compromising the drain valve. In several example embodiments, the drain assembly 16 allows fluid to drain with a fully clogged filter element 52 without compromising the drain valve because the combination of the top cap 72 and the openings 76 and 80 filter relatively large particles that may be in the fluid, preventing the particles from flowing into the fluid passage 38*a* and thus into the drain valve.

In an example embodiment, to decouple the drain plug sieve 18 from the collar 20 and thus the remainder of the drain assembly 16, an external threaded connection of a tool (not shown) is threadably engaged with the internal threaded connection 78 at the center opening 76, and then a force is applied to the tool so that the interference fit between the drain plug sieve 18 and the collar 20 is broken, and the tool and the drain plug sieve 18 move upward. As a result, the drain plug sieve 18 is decoupled from the collar 20. The drain plug sieve 18 may be cleaned, the o-ring 28 may be replaced, or the drain plug sieve 18 may be otherwise serviced, and then pushed back down into the fluid passage 58 of the collar 20, re-coupling the drain plug sieve 18 to the collar 20 via an interference fit. Alternatively, after the drain plug sieve 18 is decoupled from the collar 20, a new drain plug sieve may be coupled to the collar 20, in accordance with the foregoing.

The present disclosure introduces a drain assembly through which a fluid is adapted to flow, the drain assembly including a filter assembly including an inner tubular member, an outer tubular member within which the inner tubular member extends, and a filter element extending within an annular region defined between the inner tubular member and the outer tubular member, the inner tubular member defining a first fluid passage; and a drain plug sieve including a plurality of openings and configured to be positioned relative to the inner tubular member of the filter assembly so that: at least respective portions of one or more first openings of the plurality of openings are positioned vertically above the first fluid passage of the inner tubular member; and at least respective portions of one or more second openings of the plurality of openings are positioned vertically above the annular region defined between the inner tubular member and the outer tubular member. In some embodiments, when the fluid flows through the drain assembly: at least a first portion of the fluid passes through the one or more first openings and the first fluid passage of the inner tubular member; and at least a second portion of the fluid passes through the one or more second openings, into the annular region defined between the inner tubular member and the outer tubular member, and through the filter element. In some embodiments, the drain plug sieve is configured to be positioned relative to the inner tubular member of the filter assembly so that: each of the one or more first openings in its entirety is positioned vertically above the first fluid passage of the inner tubular member; and each of the one or more second openings in its entirety is positioned vertically above the annular region defined between the inner tubular member and the outer tubular member. In some embodiments, the one or more first openings of the drain plug sieve include a plurality of the first openings; and the one or more second openings of the drain plug sieve include a plurality of the second openings, the second openings being located radially between the first openings and an outer circumferential edge of the drain plug sieve. In some embodiments, the plurality of openings further include a center opening around which the first openings and the second openings are circumferentially spaced; the first openings are circumferentially aligned so that respective radial spacings between the center opening and each of the first openings are equal; the second openings are circumferentially aligned so that respective radial spacings between the center opening and each of the openings are equal; and an internal threaded connection is formed in an inner wall of the drain plug sieve defined by the center opening. In some embodiments, the drain assembly further includes a collar including a tubular body and a second fluid passage extending through the tubular body; wherein the drain plug sieve and the filter assembly are configured to extend within the second fluid passage of the collar. In some embodiments, the drain assembly further includes a collar including a tubular body and a second fluid passage extending through the tubular body; wherein the drain plug sieve and the filter assembly are configured to extend within the second fluid passage of the collar; and wherein the drain plug sieve further includes a tapered external side surface tapering angularly inward from an outer circumferential edge of the drain plug sieve for engagement with the collar. In some embodiments, the drain plug sieve further includes an external cylindrical side surface extending from the tapered external side surface; and an annular groove formed in the external cylindrical side surface and adapted to receive an o-ring for sealing engagement with the collar.

The present disclosure also introduces a method, including communicating a first portion of a fluid through one or more first openings of a drain plug sieve; filtering the first portion of the fluid with a filter element of a filter assembly, the filter assembly including an inner tubular member, an outer tubular member within which the inner tubular member extends, and the filter element, which filter element extends within an annular region defined between the inner tubular member and the outer tubular member; communicating a second portion of the fluid through one or more second openings of the drain plug sieve; and permitting the second portion of the fluid to flow through a first fluid passage of the inner tubular member to bypass the filter element. In some embodiments, the method further includes positioning the drain plug sieve relative to the inner tubular member of the filter assembly so that: at least respective portions of the one or more second openings are positioned vertically above the first fluid passage of the inner tubular member; and at least respective portions of the one or more first openings are positioned vertically above the annular region defined between the inner tubular member and the outer tubular member. In some embodiments, the one or more second openings of the drain plug sieve include a plurality of the second openings; and the one or more first openings of the drain plug sieve include a plurality of the first openings, the first openings being located radially between the second openings and an outer circumferential edge of the drain plug sieve. In some embodiments, the first openings are circumferentially aligned so that respective radial spacings between a center opening of the drain plug sieve and each of the first openings are equal; and the second openings are circumferentially aligned so that respective radial spacings between the center opening of the drain plug sieve and each of the second openings are equal. In some embodiments, the method further includes positioning the drain plug sieve and the filter assembly within a second fluid passage of a collar; and engaging the center opening of the drain plug sieve with a tool to remove the drain plug sieve from the second fluid passage of the collar. In some embodiments, the method further includes positioning the drain plug sieve and the filter assembly within a second fluid passage of a collar; and engaging a tapered external side surface of the drain plug sieve with the collar, the tapered external side surface tapering angularly inward from an outer circumferential edge of the drain plug sieve. In some embodiments, the method further includes sealingly engaging an o-ring with the collar, the o-ring extending within an annular groove formed in an external cylindrical side surface of the drain plug sieve, the external cylindrical side surface extending from the tapered external side surface.

The present disclosure also introduces a drain plug sieve, including a top cap; an annular body extending from the top cap; and a plurality of openings formed through the top cap, the plurality of openings including first openings and second openings located radially between the first openings and an outer circumferential edge of the top cap. In some embodiments, the plurality of openings further include a center opening around which the first openings and the second openings are circumferentially spaced; the first openings are circumferentially aligned so that respective radial spacings between the center opening and each of the first openings are equal; the second openings are circumferentially aligned so that respective radial spacings between the center opening and each of the openings are equal; and an internal threaded connection is formed in an inner wall of the top cap defined by the center opening. In some embodiments, the second openings extend through the top cap, and further through the annular body, forming respective channels in an inside surface of the annular body so that the annular body includes a plurality of the channels. In some embodiments, the top cap and the annular body together define a tapered external side surface tapering angularly inward from the outer circumferential edge of the top cap. In some embodiments, the annular body further defines an external cylindrical side surface extending from the tapered external side surface; and an annular groove adapted to receive an o-ring is formed in the external cylindrical side surface of the annular body.

It is understood that variations may be made in the foregoing without departing from the scope of the present disclosure.

In several example embodiments, the elements and teachings of the various example embodiments may be combined in whole or in part in some or all of the example embodiments. In addition, one or more of the elements and teachings of the various example embodiments may be omitted, at least in part, and/or combined, at least in part, with one or more of the other elements and teachings of the various example embodiments.

In several example embodiments, while different steps, processes, and procedures are described as appearing as distinct acts, one or more of the steps, one or more of the processes, and/or one or more of the procedures may also be performed in different orders, simultaneously and/or sequentially. In several example embodiments, the steps, processes and/or procedures may be merged into one or more steps, processes and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

Although several example embodiments have been described in detail above, the embodiments described are example only and are not limiting, and those skilled in the art will readily appreciate that many other modifications, changes and/or substitutions are possible in the example embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A drain assembly through which a fluid is adapted to flow, the drain assembly comprising:
   a filter assembly comprising an inner tubular member, an outer tubular member within which the inner tubular member extends, and a filter element extending within an annular region defined between the inner tubular member and the outer tubular member, the inner tubular member defining a first fluid passage; and
   a drain plug sieve comprising a plurality of openings and configured to be positioned relative to the inner tubular member of the filter assembly so that:
   at least respective portions of one or more first openings of the plurality of openings are positioned vertically above the first fluid passage of the inner tubular member; and
   at least respective portions of one or more second openings of the plurality of openings are positioned vertically above the annular region defined between the inner tubular member and the outer tubular member.

2. The drain assembly of claim 1, wherein, when the fluid flows through the drain assembly:
   at least a first portion of the fluid passes through the one or more first openings and the first fluid passage of the inner tubular member; and
   at least a second portion of the fluid passes through the one or more second openings, into the annular region defined between the inner tubular member and the outer tubular member, and through the filter element.

3. The drain assembly of claim 1, wherein the drain plug sieve is configured to be positioned relative to the inner tubular member of the filter assembly so that:
   each of the one or more first openings in its entirety is positioned vertically above the first fluid passage of the inner tubular member; and
   each of the one or more second openings in its entirety is positioned vertically above the annular region defined between the inner tubular member and the outer tubular member.

4. The drain assembly of claim 1, wherein:
the one or more first openings of the drain plug sieve comprise a plurality of the first openings; and
the one or more second openings of the drain plug sieve comprise a plurality of the second openings, the second openings being located radially between the first openings and an outer circumferential edge of the drain plug sieve.

5. The drain assembly of claim 4, wherein:
the plurality of openings further comprise a center opening around which the first openings and the second openings are circumferentially spaced;
the first openings are circumferentially aligned so that respective radial spacings between the center opening and each of the first openings are equal;
the second openings are circumferentially aligned so that respective radial spacings between the center opening and each of the openings are equal; and
an internal threaded connection is formed in an inner wall of the drain plug sieve defined by the center opening.

6. The drain assembly of claim 5, further comprising:
a collar comprising a tubular body and a second fluid passage extending through the tubular body;
wherein the drain plug sieve and the filter assembly are configured to extend within the second fluid passage of the collar.

7. The drain assembly of claim 1, further comprising:
a collar comprising a tubular body and a second fluid passage extending through the tubular body;
wherein the drain plug sieve and the filter assembly are configured to extend within the second fluid passage of the collar; and
wherein the drain plug sieve further comprises a tapered external side surface tapering angularly inward from an outer circumferential edge of the drain plug sieve for engagement with the collar.

8. The drain assembly of claim 7, wherein:
the drain plug sieve further comprises an external cylindrical side surface extending from the tapered external side surface; and
an annular groove formed in the external cylindrical side surface and adapted to receive an o-ring for sealing engagement with the collar.

9. A method, comprising:
communicating a first portion of a fluid through one or more first openings of a drain plug sieve;
filtering the first portion of the fluid with a filter element of a filter assembly, the filter assembly comprising an inner tubular member, an outer tubular member within which the inner tubular member extends, and the filter element, which filter element extends within an annular region defined between the inner tubular member and the outer tubular member;
communicating a second portion of the fluid through one or more second openings of the drain plug sieve; and
permitting the second portion of the fluid to flow through a first fluid passage of the inner tubular member to bypass the filter element.

10. The method of claim 9, further comprising positioning the drain plug sieve relative to the inner tubular member of the filter assembly so that:
at least respective portions of the one or more second openings are positioned vertically above the first fluid passage of the inner tubular member; and
at least respective portions of the one or more first openings are positioned vertically above the annular region defined between the inner tubular member and the outer tubular member.

11. The method of claim 9, wherein:
the one or more second openings of the drain plug sieve comprise a plurality of the second openings; and
the one or more first openings of the drain plug sieve comprise a plurality of the first openings, the first openings being located radially between the second openings and an outer circumferential edge of the drain plug sieve.

12. The method of claim 11, wherein:
the first openings are circumferentially aligned so that respective radial spacings between a center opening of the drain plug sieve and each of the first openings are equal; and
the second openings are circumferentially aligned so that respective radial spacings between the center opening of the drain plug sieve and each of the second openings are equal.

13. The method of claim 12, further comprising:
positioning the drain plug sieve and the filter assembly within a second fluid passage of a collar; and
engaging the center opening of the drain plug sieve with a tool to remove the drain plug sieve from the second fluid passage of the collar.

14. The method of claim 9, further comprising:
positioning the drain plug sieve and the filter assembly within a second fluid passage of a collar; and
engaging a tapered external side surface of the drain plug sieve with the collar, the tapered external side surface tapering angularly inward from an outer circumferential edge of the drain plug sieve.

15. The method of claim 14, further comprising:
sealingly engaging an o-ring with the collar, the o-ring extending within an annular groove formed in an external cylindrical side surface of the drain plug sieve, the external cylindrical side surface extending from the tapered external side surface.

16. A drain plug sieve, comprising:
a top cap;
an annular body extending from the top cap; and
a plurality of openings formed through the top cap, the plurality of openings comprising:
first openings; and
second openings located radially between the first openings and an outer circumferential edge of the top cap;
wherein:
the plurality of openings further comprise another opening; and
an internal threaded connection is formed in an inner wall of the top cap defined by the another opening.

17. The drain plug sieve of claim 16, wherein:
the top cap and the annular body together define a tapered external side surface tapering angularly inward from the outer circumferential edge of the top cap.

18. The drain plug sieve of claim 16, wherein the another opening is a center opening around which the first openings and the second openings are circumferentially spaced.

19. A drain plug sieve, comprising:
a top cap;
an annular body extending from the top cap; and
a plurality of openings formed through the top cap, the plurality of openings comprising:
first openings; and second openings located radially between the first openings and an outer circumferential edge of the top cap;

wherein:

the plurality of openings further comprise a center opening around which the first openings and the second openings are circumferentially spaced;

the first openings are circumferentially aligned so that respective radial spacings between the center opening and each of the first openings are equal;

the second openings are circumferentially aligned so that respective radial spacings between the center opening and each of the openings are equal; and an internal threaded connection is formed in an inner wall of the top cap defined by the center opening.

20. A drain plug sieve, comprising:

a top cap;

an annular body extending from the top cap; and a plurality of openings formed through the top cap, the plurality of openings comprising:

first openings; and second openings located radially between the first openings and an outer circumferential edge of the top cap;

wherein the second openings extend through the top cap, and further through the annular body, forming respective channels in an inside surface of the annular body so that the annular body includes a plurality of the channels.

21. A drain plug sieve, comprising:

a top cap;

an annular body extending from the top cap; and a plurality of openings formed through the top cap, the plurality of openings comprising:

first openings; and second openings located radially between the first openings and an outer circumferential edge of the top cap;

wherein the top cap and the annular body together define a tapered external side surface tapering angularly inward from the outer circumferential edge of the top cap; and wherein:

the annular body further defines an external cylindrical side surface extending from the tapered external side surface; and an annular groove adapted to receive an o-ring is formed in the external cylindrical side surface of the annular body.

22. A drain plug sieve, comprising:

a top cap;

an annular body extending from the top cap; and a plurality of openings formed through the top cap, the plurality of openings comprising:

first openings; and second openings located radially between the first openings and an outer circumferential edge of the top cap;

wherein the top cap and the annular body together define a tapered external side surface tapering angularly inward from the outer circumferential edge of the top cap; and wherein the annular body further defines an external cylindrical side surface extending from the tapered external side surface.

23. The drain plug sieve of claim 22, wherein:

an annular groove adapted to receive an o-ring is formed in the external cylindrical side surface of the annular body;

the plurality of openings further comprise another opening; and an internal threaded connection is formed in an inner wall of the top cap defined by the another opening.

24. The drain plug sieve of claim 23, wherein the another opening is a center opening around which the first openings and the second openings are circumferentially spaced.

* * * * *